(12) United States Patent
Gelfand

(10) Patent No.: US 7,822,784 B2
(45) Date of Patent: Oct. 26, 2010

(54) DATA CELLS AND DATA CELL GENERATIONS

(75) Inventor: Boris Gelfand, Chanhassen, MN (US)

(73) Assignee: Information Bionics, Incorporated, St. Paul, MN (US)

( * ) Notice: Subject to any disclaimer, the term of this patent is extended or adjusted under 35 U.S.C. 154(b) by 1221 days.

(21) Appl. No.: 11/283,982

(22) Filed: Nov. 21, 2005

(65) Prior Publication Data

US 2006/0085457 A1     Apr. 20, 2006

Related U.S. Application Data

(62) Division of application No. 09/897,690, filed on Jun. 29, 2001, now Pat. No. 7,016,900.

(60) Provisional application No. 60/215,447, filed on Jun. 30, 2000.

(51) Int. Cl.
G06F 17/30     (2006.01)

(52) U.S. Cl. ........................ 707/804; 707/960; 707/962; 709/220

(58) Field of Classification Search ................. 707/101, 707/102, 103 R, 804, 960, 962; 709/220
See application file for complete search history.

(56) References Cited

U.S. PATENT DOCUMENTS

| | | | |
|---|---|---|---|
| 4,864,497 A | | 9/1989 | Lowry et al. |
| 5,019,961 A | * | 5/1991 | Addesso et al. ............... 700/87 |
| 5,371,675 A | | 12/1994 | Greif et al. |
| 5,515,531 A | * | 5/1996 | Fujiwara et al. ............. 707/708 |
| 5,560,006 A | * | 9/1996 | Layden et al. ............. 707/713 |
| 5,598,519 A | | 1/1997 | Narayanan |
| 5,680,530 A | * | 10/1997 | Selfridge et al. ............ 345/440 |
| 5,717,924 A | * | 2/1998 | Kawai ........................ 707/102 |
| 5,721,913 A | * | 2/1998 | Ackroff et al. .............. 707/736 |
| 5,774,661 A | * | 6/1998 | Chatterjee et al. ........... 709/203 |

(Continued)

FOREIGN PATENT DOCUMENTS

JP     406/052139     2/1994

OTHER PUBLICATIONS

Tsurt, Shalom et al., "An Implementation of GEM—supporting a semantic data model on a relational back-end." ACM 1984, pp. 286-295.

(Continued)

*Primary Examiner*—Shahid A Alam
(74) *Attorney, Agent, or Firm*—Beck & Tysver, PLLC

(57) ABSTRACT

Data cells are described containing an entity identifier ("O"), an entity type ("E") an attribute type ("A"), and an attribute value ("V"). Cells with identical O and E values constitute a cell set. Pairs of synapse cells relate cell sets, each synapse cell having O and E values of one cell set and A and V values equal to the E and O values of the other cell set. Cell generations store information about attributes, entities, relationships, constraints, and default data formats in the same cell listing as the cells containing the actual real-world data. As a result, the data in a data cell can be considered self-identifying. The present invention also provides a way to normalize data using data pool cell sets. The data cells themselves can be stored in multiple, co-existing storage trees that are specialized for increased data query efficiency.

16 Claims, 11 Drawing Sheets

U.S. PATENT DOCUMENTS

| | | | |
|---|---|---|---|
| 5,819,293 | A | 10/1998 | Comer et al. |
| 5,852,819 | A | 12/1998 | Beller |
| 5,893,087 | A | 4/1999 | Wlaschin et al. |
| 5,907,846 | A | 5/1999 | Berner et al. |
| 5,930,799 | A | 7/1999 | Tamano et al. |
| 5,933,634 | A | 8/1999 | Enokido et al. |
| 5,937,155 | A | 8/1999 | Kennedy et al. |
| 5,960,437 | A | 9/1999 | Krawchuk et al. |
| 5,970,506 | A | 10/1999 | Kiyan et al. |
| 6,047,297 | A | 4/2000 | Johnson et al. |
| 6,070,165 | A * | 5/2000 | Whitmore .................. 707/101 |
| 6,081,809 | A | 6/2000 | Kumagai |
| 6,101,502 | A | 8/2000 | Heubner et al. |
| 6,122,641 | A | 9/2000 | Williamson et al. |
| 6,154,748 | A | 11/2000 | Gupta et al. |
| 6,195,651 | B1 | 2/2001 | Handel et al. |
| 6,208,992 | B1 | 3/2001 | Bruckner |
| 6,356,896 | B1 | 3/2002 | Cheng et al. |
| 6,397,206 | B1 | 5/2002 | Hill et al. |
| 6,421,658 | B1 | 7/2002 | Carey et al. |
| 6,438,562 | B1 | 8/2002 | Gupta et al. |
| 6,714,936 | B1 | 3/2004 | Nevin, III |
| 6,868,441 | B2 * | 3/2005 | Greene et al. ............... 709/220 |
| 6,917,943 | B2 | 7/2005 | Butler |
| 7,401,131 | B2 * | 7/2008 | Robertson et al. ........... 709/220 |
| 2002/0147611 | A1 * | 10/2002 | Greene et al. ................. 705/1 |

OTHER PUBLICATIONS

Carey, Michael et al., "O-O, What Have They Done to DB2?" Proceedings of the 25th VLDB Conference, Edinburgh, Scotland, 1999, pp. 542-553.

Nixon, Brian et al., "Implementation of a Compiler for a Semantic Data Model: Experiences with Taxis", ACM 1987, pp. 118-131.

Mylopoulos, John et al., "A Perspective for Research on Conceptual Modelling", ACM 1980, pp. 167-170.

Hull, Richard et al., "Semantic Database Modeling: Survey, Applications and Research Issues", ACM Computing Surveys, vol. 19, No. 3, Sep. 1987, pp. 201-260.

D.S. Batory, T.Y. Leung and T.E. Wise, Implementation Concepts for an Extensible Data Model and Data Language, ACM Transactions on Database Systems, vol. 13, No. 3, Sep. 1988, pp. 231-262.

Neils Nes, Architecture of Monet, Friday, Jul. 26 15:20:35 MET DST 1996, http://homepages.cwi.nl/~niels/Pub/image_retrieval/node4.html.

Shipman, David W., "The Functional Data Model and the Data Language DAPLEX", ACM Transaction on Database Systems, vol. 6, No. 1, Mar. 1981, pp. 140-173.

* cited by examiner

Figure 1 (Prior Art)

EMPLOYEE

| Employee Name | Social Security # | Address | Salary |
|---|---|---|---|
| Johnson | 100-10-1000 | Minneapolis | 50,000 |
| Anderson | 200-20-2000 | Milwaukee | |
| Rodriguez | 300-30-3000 | Cleveland | 30,000 |

Figure 2 (Prior Art)

PROJECT

| Project Name | Project Size |
|---|---|
| Red | Large |
| Yellow | Medium |
| Green | Small |

Figure 3 (Prior Art)

EMPLOYEE PROJECT

| Project Name | Employee Name |
|---|---|
| Red | Johnson |
| Red | Anderson |
| Yellow | Rodriguez |
| Green | Rodriguez |

Figure 4

| O | E | A | V |
|---|---|---|---|
| Entity Instance Identifier | Entity Type Identifier | Attribute Type Identifier | Attribute Value |

Figure 5

| O | E | A | V |
|---|---|---|---|
| Object ID | Employee | Salary | 50,000 |

Figure 6

| O | E | A | V |
|---|---|---|---|
| 1 | Employee | Employee Name | Johnson |
| 1 | Employee | Social Security | 100-10-1000 |
| 1 | Employee | Address | Minneapolis |
| 1 | Employee | Salary | 50,000 |
| 2 | Employee | Employee Name | Anderson |
| 2 | Employee | Social Security | 200-20-2000 |
| 2 | Employee | Address | Milwaukee |
| 3 | Employee | Employee Name | Rodriguez |
| 3 | Employee | Social Security | 300-30-3000 |
| 3 | Employee | Address | Cleveland |
| 3 | Employee | Salary | 30,000 |
| 20 | Project | Project Name | Red |
| 20 | Project | Size | Large |
| 21 | Project | Project Name | Yellow |
| 21 | Project | Size | Medium |
| 22 | Project | Project Name | Green |
| 22 | Project | Size | Small |

Figure 7

| O | E | A | V |
|---|---|---|---|
| 1 | Employee | First Name | Sue |
| 1 | Employee | Spouse | Joe |
| 1 | Employee | Title | President |

Figure 8

| O | E | A | V |
|---|---|---|---|
| 1 | Employee | Employee Name | Johnson |
|  |  |  |  |
| 20 | Project | Project Name | Red |
|  |  |  |  |
| 1 | Employee | Project | 20 |

Figure 9

| O | E | A | V |
|---|---|---|---|
| 1 | Employee | Employee Name | Johnson |
|  |  |  |  |
| 20 | Project | Project Name | Red |
|  |  |  |  |
| 20 | Project | Employee | 1 |

Figure 10

| O | E | A | V |
|---|---|---|---|
| 1 | Employee | Employee Name | Johnson |
| • | • | • | • |
| • | • | • | • |
| • | • | • | • |
| 22 | Project | Size | Small |
| 1 | Employee | Project | 20 |
| 2 | Employee | Project | 20 |
| 3 | Employee | Project | 21 |
| 3 | Employee | Project | 22 |
| 20 | Project | Employee | 1 |
| 20 | Project | Employee | 2 |
| 21 | Project | Employee | 3 |
| 22 | Project | Employee | 3 |

Figure 11

| Number | Type | Value |
|---|---|---|
| 1000 | Entity | Employee |
| 1001 | Entity | Project |
| 1010 | Attribute | Employee Name |
| 1011 | Attribute | Social Security |
| 1012 | Attribute | Address |
| 1013 | Attribute | Salary |

Figure 12

| O | E | A | V |
|---|---|---|---|
| 1 | 1000 | 1010 | Johnson |
| 1 | 1000 | 1011 | 100-10-1000 |
| 1 | 1000 | 1012 | Minneapolis |
| 1 | 1000 | 1013 | 50,000 |

Figure 13

| O | E | A | V |
|---|---|---|---|
| 100 | 0 | 0 | Keyword |
| 101 | 0 | 0 | String |
| 200 | 100 | 101 | Entity |
| 201 | 100 | 101 | Attribute |
| 202 | 100 | 101 | Name |
| 1000 | 200 | 202 | Employee |
| 1001 | 200 | 202 | Project |
| 1010 | 201 | 202 | Employee Name |
| 1011 | 201 | 202 | Social Security |
| 1012 | 201 | 202 | Address |
| 1013 | 201 | 202 | Salary |
| 1 | 1000 | 1010 | Johnson |
| 1 | 1000 | 1011 | 100-10-1000 |
| 1 | 1000 | 1012 | Minneapolis |
| 1 | 1000 | 1013 | 50,000 |

Figure 14

| O | E | A | V | |
|---|---|---|---|---|
| 100 | 0 | 0 | Keyword | |
| 101 | 0 | 0 | String | |
| 200 | 100 | 101 | Entity | |
| 201 | 100 | 101 | Attribute | |
| 202 | 100 | 101 | Name | |
| *203* | *100* | *101* | *AConstraint* | ~320 |
| *204* | *100* | *101* | *Type* | ~322 |
| *205* | *100* | *101* | *EConstraint* | ~340 |
| *206* | *100* | *101* | *References* | ~342 |
| *207* | *100* | *101* | *Referenced By* | ~344 |
| 1000 | 200 | 202 | Employee | |
| 1000 | 200 | 203 | 1101 | ~362 |
| 1001 | 200 | 202 | Project | |
| 1001 | 200 | 203 | 1101 | ~364 |
| 1010 | 201 | 202 | Employee Name | |
| 1011 | 201 | 202 | Social Security | |
| *1011* | *201* | *203* | *1100* | ~330 |
| 1012 | 201 | 202 | Address | |
| 1013 | 201 | 202 | Salary | |
| *1100* | *203* | *202* | *SS Constraint* | ~324 |
| *1100* | *203* | *204* | *Not Null* | ~326 |
| *1100* | *203* | *201* | *1011* | ~328 |
| 1101 | 205 | 202 | E/P EConstraint | ~350 |
| 1101 | 205 | 204 | Strong | ~352 |
| 1101 | 205 | 206 | 1000 | ~354 |
| 1101 | 205 | 207 | 1001 | ~356 |
| 1101 | 205 | 200 | 1000 | ~358 |
| 1101 | 205 | 200 | 1001 | ~360 |
| 1 | 1000 | 1010 | Johnson | |
| 1 | 1000 | 1011 | 100-10-1000 | |
| 1 | 1000 | 1012 | Minneapolis | |
| 1 | 1000 | 1013 | 50,000 | |

Figure 15

| O | E | A | V |
|---|---|---|---|
| 100 | 0 | 0 | Keyword |
| 101 | 0 | 0 | String |
| 200 | 100 | 101 | Entity |
| 201 | 100 | 101 | Attribute |
| 202 | 100 | 101 | Name |
| 203 | 100 | 101 | Data Format |
| 204 | 100 | 101 | Data Type |
| 205 | 100 | 101 | Length |
| 1000 | 200 | 202 | Employee |
| 1000 | 200 | 201 | 1010 |
| 1000 | 200 | 201 | 1011 |
| 1000 | 200 | 201 | 1012 |
| 1000 | 200 | 201 | 1013 |
| 1001 | 200 | 202 | Project |
| 1010 | 201 | 202 | Employee Name |
| 1010 | 201 | 200 | 1000 |
| 1010 | 201 | 203 | 1100 |
| 1011 | 201 | 202 | Social Security |
| 1011 | 201 | 200 | 1000 |
| 1012 | 201 | 202 | Address |
| 1012 | 201 | 200 | 1000 |
| 1013 | 201 | 202 | Salary |
| 1013 | 201 | 200 | 1000 |
| 1100 | 203 | 204 | String |
| 1100 | 203 | 205 | 50 |
| 1100 | 203 | 201 | 1010 |
| 1 | 1000 | 1010 | Johnson |
| 1 | 1000 | 1011 | 100-10-1000 |
| 1 | 1000 | 1012 | Minneapolis |
| 1 | 1000 | 1013 | 50,000 |

Figure 16

| Name | Description |
|---|---|
| Cell Type | Whether the cell is a synapse cell or a data cell, and whether the cell contains multiple V values |
| Cell Status | The current status of the cell (retrieved, updated, or deleted) |
| Data Type | Data type of the information stored in the V field |

Figure 17

| O | E | A | V |
|---|---|---|---|
| 1000 | Entity | Name | Person |
| 1001 | Entity | Name | City |
| 2000 | Attribute | Name | Person's Name |
| 2001 | Attribute | Name | City Name |
| 2002 | Attribute | Name | Mayor |
| 1 | 1000 | 2000 | Johnson |
| 1 | 1000 | 1001 | 10 |
| 10 | 1001 | 2001 | Big Town |
| 10 | 1001 | 2002 | Belton |
| 10 | 1001 | 1000 | 1001.1 |

Figure 18

| O | E | A | V |
|---|---|---|---|
| 1001 | Entity | Name | City |
| 2001 | Attribute | Name | City Name |
| 2003 | Attribute | Name | State |
| 10 | 1001 | 2001 | Big Town |
| 10 | 1001 | 2002 | Belton |
| 10 | 1001 | 2003 | Minnesota |
| 11 | 1001 | 2001 | Minneapolis |
| 11 | 1001 | 2003 | Minnesota |
| 12 | 1001 | 2001 | St. Paul |
| 12 | 1001 | 2003 | Minnesota |

Figure 19

| O | E | A | V |
|---|---|---|---|
| 1001 | Entity | Name | City |
| 1100 | Keyword | Name | Pool |
| 2001 | Attribute | Name | City Name |
| 2003 | Attribute | Name | State |
| 10 | 1001 | 2001 | Big Town |
| 10 | 1001 | 2002 | Belton |
| 10 | 1001 | 2003 | 1100.100 |
| 11 | 1001 | 2001 | Minneapolis |
| 11 | 1001 | 2003 | 1100.100 |
| 12 | 1001 | 2001 | St. Paul |
| 12 | 1001 | 2003 | 1100.100 |
| 100 | 1100 | Value | Minnesota |
| 100 | 1100 | Count | 3 |
| 100 | 1100 | Level | EA |
| 100 | 1100 | E_Compare | 1001 |
| 100 | 1100 | A_Compare | 2003 |

Figure 24

| O | E | A | V | |
|---|---|---|---|---|
| 100 | 0 | 0 | Keyword | |
| 101 | 0 | 0 | String | |
| 200 | 100 | 101 | Entity | |
| 201 | 100 | 101 | Attribute | |
| 202 | 100 | 101 | Name | |
| 1000 | 200 | 202 | Employee | |
| 1010 | 201 | 202 | Employee Name | |
| 1012 | 201 | 202 | Address | 570 |
| 1 | 1000 | 1010 | Johnson | 552 |
| 1 | 1000 | 1012 | Minneapolis | 554 |
| 1 | 1000 | 1012 | St. Paul | 556 |
| 2 | 1000 | 1010 | Rodriguez | 562 |
| 2 | 1000 | 1012 | Cleveland | 564 |

551 = { Johnson, Minneapolis, St. Paul rows }
560 = { Rodriguez, Cleveland rows }

Figure 25

| O | E | A | V | |
|---|---|---|---|---|
| 100 | 0 | 0 | Keyword | |
| 101 | 0 | 0 | String | |
| 200 | 100 | 101 | Entity | |
| 201 | 100 | 101 | Attribute | |
| 202 | 100 | 101 | Name | |
| 1000 | 200 | 202 | Employee | |
| 1010 | 201 | 202 | Employee Name | |
| 1012 | 201 | 202 | Address-Single | 572 |
| 1014 | 201 | 202 | Address-Multiple | 574 |
| 1 | 1000 | 1010 | Johnson | |
| 1 | 1000 | 1014 | 10 | 558 |
| 2 | 1000 | 1010 | Rodriguez | |
| 2 | 1000 | 1012 | Cleveland | 564 |
| 10 | 1014 | 1 | Minneapolis | 582 |
| 10 | 1014 | 2 | St. Paul | 584 |
| 10 | 1014 | 1000 | 1 | 586 |

DATA CELLS AND DATA CELL GENERATIONS

CROSS-REFERENCE TO RELATED APPLICATIONS

This application is a divisional application of U.S. patent application Ser. No. 09/897,690, filed on Jun. 29, 2001 now U.S. Pat. No. 7,016,900, which claimed the benefit of U.S. Provisional Application Ser. No. 60/215,447, filed on Jun. 30, 2000.

TECHNICAL FIELD

The present invention relates generally to database systems. More particularly, the present invention relates to a system and method for storing and accessing data in data cells.

BACKGROUND OF THE INVENTION

Current database technology generally relies on one of three main types: relational databases, object-oriented databases, or a combination of relational and object-oriented databases. Relational databases divide the world into tables, with columns defining data fields and rows defining data records. Relational databases then use relationships and set theory to model and manage real-world data. Object-oriented databases model the world in objects, in which data is encapsulated into objects and associated with methods and procedures. Object-relational databases are a combination of the previous two types.

All of these database constructs are primarily concerned with organizing data into predefined formats and structures. In order to represent the data, an object or a table must be defined with known data characteristics. For instance, before data can be stored in an object, the object must be defined to allow certain types of data, and the object must be pre-associated with relevant procedures. Alternatively, in the relational database construct, a table must be defined before any data can be stored in the table, with each column being defined to allow only certain amounts and types of data.

Unfortunately, this pre-defining of data is always done without a perfect knowledge of the real-world data being modeled. As a result, once the database is actually implemented, changes often must be made to the table definitions or objects so as to more accurately reflect the real-world data. These changes will typically require that the database be reconstructed according to the new definitions. In addition, even after an optimum definition of the real-word data is created, the existing database constructs are not flexible enough to handle unique situations that do not fit the optimum definition. Once this definition is created, along with the related data formats, relationships, and methods, the created structure cannot be easily modified to allow the representation of the unusual case.

What is needed is a database construct that is not as rigid as the existing models of relational and object-oriented databases. This preferred model would not require a pre-definition of the data, but would rather allow data to be entered as it is encountered. Associations between data elements could be developed on-the-fly, and new data could be added to the system even if the pre-existing model did not expect such data to exist.

SUMMARY OF THE INVENTION

The present invention meets the needs and overcomes the associated limitations of the prior art by storing data in cells. A data cell contains only a single element of data. By storing all data in these cells, data can be dynamically structured according to changing needs. In addition, the information stored in the cell is easily accessible, meaning that data extrapolation is quick and easy. Additional references to a particular data value will always use the one data value that has been dynamically normalized by the present invention. Finally, meta data that defines data structures and types are stored in data cells, which allows the data collection to be self-defining.

The data cell of the present invention includes four elements: an Entity Instance Identifier (identified in this application through the letter "O"), an Entity Type Identifier ("E"), an Attribute Type Identifier ("A"), and an Attribute Value ("V"). For instance, the existence of an employee who is named "Johnson" would be represented by a single cell. The Entity Type Identifier would be an "Employee." The Entity Instance Identifier is an identifier, such as the number "1," that allows the employee to be uniquely identified. The Attribute Type Identifier would be the "Employee Name," and the Attribute Value would be "Johnson." The data cell would look like the following:

| O | E | A | V |
|---|---|---|---|
| 1 | Employee | Employee Name | Johnson |

Groups of cells with identical O and E values constitute a cell set, and contain information about a specific instance of an entity. Every cell contains a unique combination of O, E, A, and V, meaning that each cell is unique within any particular information universe.

Relationships between cells and cell sets are created through the use of "linking" or "synapse" cells. Synapse cells are created through a process of transmutation. In transmutation, two cell sets are associated with each other through the creation of two synapse cells. The first synapse cell has the O and E values of the first cell set, and has an A and V value equal to the E and O value, respectively, of the second cell set. The second synapse cell has the O and E values of the second cell set, and has as its A and V values the E and O value, respectively, of the first cell set.

BRIEF DESCRIPTION OF THE DRAWINGS

FIG. 1 is a prior art database table showing a sample representation of employee data in a relational database system.

FIG. 2 is a prior art database table showing a sample representation of project data in a relational database system.

FIG. 3 is a prior art database table showing a sample representation of relationship data in a relational database system.

FIG. 4 is a schematic illustration of a cell of the present invention showing the four components of a data cell.

FIG. 5 shows an example data cell.

FIG. 6 is a cell listing of present invention data cells containing the data stored in the tables shown in FIGS. 1 and 2.

FIG. 7 is a cell listing showing three cells that can be added to the cell set list.

FIG. 8 is a schematic drawing showing the first stage of transmutation to create a synapse cell linking an employee cell set with a project cell set.

FIG. 9 is a schematic drawing showing the second stage of transmutation to create a second synapse cell linking a project cell set with an employee cell set.

FIG. 10 is a cell listing showing a portion of the data cells shown in FIG. 6 along with the synapse cells setting forth the relationships found in FIG. 3.

FIG. 11 is a data table containing a data dictionary.

FIG. 12 is a cell listing containing the first four cells of FIG. 6 utilizing the data dictionary.

FIG. 13 is a self-defining data dictionary in data cell format along with the cells shown in FIG. 12.

FIG. 14 is a cell listing containing attribute constraints and constraints on the creation and destruction of associations.

FIG. 15 is a cell listing containing data formats and associations between entities and attributes.

FIG. 16 is a table showing the meta-data stored with each cell in the preferred embodiment of the present invention.

FIG. 17 is a cell listing showing a cell-to-set association.

FIG. 18 is a cell listing showing multiple cells having the same value in the V field.

FIG. 19 is a cell listing showing a data pool normalizing the data of FIG. 18.

FIG. 24 is a cell listing showing multiple attribute values for a single attribute.

FIG. 25 is a cell listing showing an alternative embodiment with a cell set for handling the multiple attribute values of FIG. 24.

DETAILED DESCRIPTION OF THE INVENTION

1. Prior Art

Figure 20:
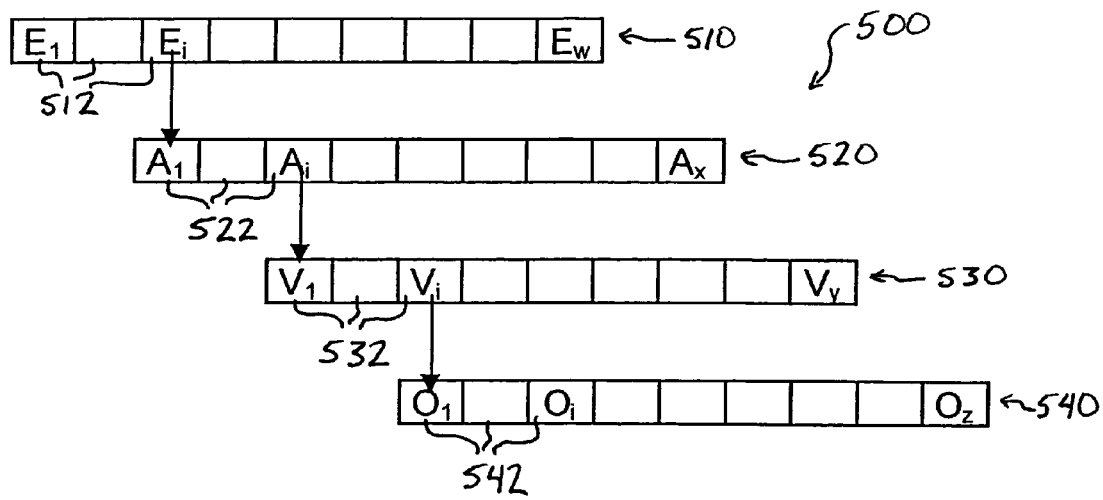
FIG. 20 is a graphical representation of a storage tree for storing cells in an E-A-V-O hierarchy.

FIGS. 1 through 3 show three relational tables as would be used in the prior art. The first table 10 shown in FIG. 1 contains employees. There are four columns in this table 10, namely employee name 12, social security number 14, address 16, and salary 18. These columns 12, 14, 16, and 18 define the different types of data that can be contained in table 10. Table 10 also contains three rows 20 of data. Each row 20 contains information about a different employee in the table 10. Data values for a relational data table such as table 10 are determined by finding the field that exists at the cross section between a particular row 20 and a particular column 12, 14, 16, or 18.

Similarly, the second table 40 shown in FIG. 2 contains information about projects that employees might work on for their employer. The projects table 40 shown in FIG. 2 contains only two columns, namely a project name column 42 and a project size column 44. The projects table 40 contains information about three projects, and therefore the table contains exactly three rows 46.

It is often important in databases to model the fact that some data is associated with other data. In the example of employees and projects, as shown in FIGS. 1 and 2, the database should show that certain employees work on certain projects. If only one employee can be assigned to a project, it would be possible to associate an employee with a project simply by adding an employee column to the project table 40. Similarly, if each employee were assigned only to a single project, a project column in the employee table 10 would serve to make the association.

However, in the real world, it is likely that each project will have more than one employee assigned to it, and it is likely that each employee will be assigned to more than one project. To handle the possibility of these types of many-to-many relationships, it is necessary to utilize a third table 60, such as that shown in FIG. 3. This third table 60 contains only two columns, namely project name 62 and employee name 64. The project name column 62 contains the same type of information as the project name column 42 in table 40. Likewise, employee name column 64 contains the same information as employee name column 12 of table 10. Each row 66 represents a relationship between a row 20 in table 10 (i.e., an employee) and a row 46 in table 40 (i.e., a project). Thus, table 60 shows that the Red project has two employees working on it, namely Johnson and Anderson, while the Yellow and Green projects have only a single employee assigned to them, namely Rodriguez.

Very often, relational databases utilize key fields to aid in data access. The data in a key field must be unique for the entire table. Thus, a key field for the employee table 10 might be the social security number column, since the U.S. government strives to ensure that each social security number is unique to one individual. In project table 40, it might be wise to create a project number column that is subject to a uniqueness constraint to ensure that no two rows 46 contain the same project number. The key fields are then pre-indexed, which allows fast access to data in a table when the key field is known. These key fields can then be used to create efficient relationships in a table such as table 60.

2. Data Cells

The present invention differs from traditional relational and object-oriented databases in that all data is stored in data cells 100. In its most generic sense, a data cell 100 is a data construct that contains a single attribute value. In comparison to a relational database table, a single data cell would contain the value of a field found at a single column and row intersection. The data cell 100 of the present invention differs from an intersection in a data table in that the data cell 100 is not stored within a table or an object construct. Because there is no external construct to associate one cell 100 with another, each data cell 100 of the present invention must be self-identifying. In other words, the data cell 100 must contain not only the value of interest, but it also must contain enough information to identify the attribute to which the value relates, and to associate the attribute with a particular instance of an entity.

As shown in FIG. 4, the preferred embodiment of a data cell 100 utilizes four fields: an Entity Instance Identifier 102, an Entity Type Identifier 104, an Attribute Type Identifier 106, and an Attribute Value 108. These four fields 102, 104, 106, and 108 are also identified by the one letter titles "O," "E," "A," and "V," respectively.

The O field 102 is the Entity Instance Identifier, and serves to uniquely identify the entity that is associated with the data cell 100. The E field 104 is the Entity Type Identifier, which identifies the type of entity associated with the cell 100. The O field 102 and the E field 104 together uniquely identify an entity in an information universe. An information or data universe is defined as the complete collection of data cells 100 that exist together. All cells 100 with the same O field 102 and E field 104 within an information universe are considered part of the same cell set 101. All cells 100 within a cell set 101 are used to store data and relationships about the particular entity instance identified by the combination of the O and E fields 102, 104.

The A or Attribute Type Identifier field 106 indicates the type of information found in the cell 100. Finally, the V or Attribute Value field 108 contains the actual real-world information that is found in the cell 100. The data in V 108 can be of any type, including a character string, a number, a picture, a short movie clip, a voice print, an external pointer, an executable, or any other type of data.

Each cell 100 contains one unit or element of information, such as the fact that a particular employee makes $50,000 per year. The data cell 100 that contains this information might look like that shown in FIG. 5. The O field 102 contains the phrase "Object ID," which indicates that the O field 102 contains some type of identifier to uniquely identify the employee that has this salary. In the preferred embodiment, the object identifiers in the O field 102 are integers. The E field 104 of FIG. 5 indicates that the type of entity that this cell 100 applies to is an employee. The A field 106 shows that this cell 100 describes the salary attribute. Finally, the V field 108 contains the actual, real-world data for the cell 100, namely the $50,000 salary.

FIG. 6 shows the data found in FIGS. 1 and 2 in the form of data cells 100 of the current invention. For each employee in table 10, the four columns 12, 14, 16, and 18 of data are embodied in four separate data cells 100. The data for the employee named Johnson are found in the first four data cells 100 in FIG. 6. Since these first four data cells 100 all contain the same O and E values, these cells 100 form a cell set 101. More specifically, the O field 102 and E field 104 indicate that this first cell set 101 contains information about instance number "1" of an entity of type "Employee." The A fields 106 of these four cells 100 represent the four attributes for which data has been stored, namely Employee Name, Social Security, Address, and Salary. The V fields 108 holds the actual values for these attributes.

An examination of FIGS. 1, 2, and 6 reveals that all of the information stored in tables 10 and 40 has been replicated in individual data cells 100 of FIG. 6. In FIG. 1, the employee Anderson has no salary value in column 18. Thus, the second cell set 101 in FIG. 6 contains only three cells 100, since no cell 100 is needed to represent that fact that no information is known about Anderson's salary. This differs from relational database table of FIG. 1, where each column 12, 14, 16, and 18 must exist for all employee rows 20, even in cases where no value exists and the field simply sits empty.

Moreover, this flexibility makes it possible to have additional cells 100 for some cell sets 101 that do not exist in other cell sets 101. FIG. 7 shows three possible additional cells 100 that relate to the employee named "Johnson." With the flexibility of the cell-based data structure of the present invention, it is possible to add cells 100 such as those shown in FIG. 7 on the fly. There is no need to restructure the database to allow such new information, as would be required if new information were to be tracked in a prior art relational or object oriented database.

3. Transmutation

As shown in FIG. 3, an association between the employee named Johnson and the project named Red is created in a relational database by creating a row 66 in a relationship table 60. An association between cells 100 and/or cell sets 101 can also be created in the cell-based data structure of the present invention. This is accomplished through the use of special types of cells known as synapse cells 110.

Synapse cells 110 are created through a process known as transmutation, which is illustrated in FIGS. 8 and 9. FIG. 8 shows two conventional cells 100, the first belonging to the cell set 101 relating to the employee named Johnson, and the second belonging to the cell set 101 relating to the Red project. The synapse cell 110 that establishes an association between these two cell sets 101 is created by making a new synapse cell 110 based upon the values of cells 100 from the two cell sets 101. The new synapse cell is given the same O 102 and E 104 values of the first cell set 101, in this case the values "1" and "Employee." The A 106 and the V 108 values of the synapse cell 110 are taken from the E 104 and the O 102 values, respectively, of the second cell 100. This "transmutation" of the existing cells 100 into a new synapse cell 110 is represented in FIG. 8 by four arrows.

The association of the two cell sets 101 is not complete, however, with the creation of a single synapse cell 110. This is because every association created in the present invention is preferably a two-way association, and therefore requires the creation of a second synapse cell, as shown in FIG. 9. This second synapse cell 110 is created using the same O 102 and E 104 values as that of the second cell 100. The A 106 and the V 108 values of this second synapse cell 110 are taken from the E 104 and the O 102 values, respectively, of the first cell 100 being associated. The transmutation into the second synapse cell 110 is shown by the arrows in FIG. 9.

When the two synapse cells 110 shown in FIGS. 8 and 9 have been created, then the association between the cell sets 101 has been completed. FIG. 10 shows the cell listing of FIG. 6, with the first and last cells 100 of FIG. 6 surrounding vertical ellipses that represent all of the other cells 100 of FIG. 6. In addition to the cells 100 of FIG. 6, the cell listing of FIG. 10 includes the synapse cells 110 that are needed to represent the relationships shown in table 60 of FIG. 3. It is clear that each synapse cell 110 has a partner synapse cell 110 that shows the same association in the opposite direction. Thus, eight synapse cells are used to represent the four relationships shown in table 60 of FIG. 3.

The synapse cells 110 are generally treated the same as other cells 100 that exist in a data universe. Occasionally, it is useful to be able to know whether a particular cell 100 contains actual data, or is a synapse cell 110. In the present invention, this is accomplished by associating a value, bitmap, or other flagging device with each cell 100 in the data universe. By examining this value, it would be possible for a database management system to immediately determine whether the cell 100 is a synapse cell 110 or contains real-world data.

The terms synapse and cell are used in this description to allude to the similarity between the present invention and the way that the human brain is believed to store memories. When the brain encounters new data, the data is stored in the brain's memory cells. The brain does not pre-define the data into tables or objects, but rather simply accepts all data "on-the-fly" and puts it together later.

Research has shown that the synapses in the brain hook cells together. Where synapse pathways are more frequently traversed in the brain, those pathways become thicker or are connected with more synapses. As a result, these connections become stronger. At the same time, other connections can be formed in the brain that can be loose or incorrect. Yet these memory errors to not corrupt the database of the brain. Rather, the brain is constantly checking associations for validity, and correcting those associations as needed.

This is similar to the present invention. Data is encountered and placed into data cells 100. There is no need to predefine tables or objects before a new source of data is encountered. New cells 100 are simply created as needed. Synapse cells 101 can be formed between those data cells 100 on the fly. The associations that are represented by these synapse cells 101 can be strong or week, and be broken as needed without altering the structure of the database.

4. Data Dictionaries

Because all data in the present invention is stored in cells 100, great efficiency can be created by regulating the format of each cell 100. For instance it is possible to require that each O 102, E 104, and A 106 value be a fixed length field. In the preferred embodiment, for instance, each of these fields is a fixed-length integer, such as a four byte long integer. A four-byte long integer allows the fields to contain an integer between minus two billion and positive two billion.

In order to use integers in the E 104 or A 106 fields, it is necessary to provide a means to look up and interpret the integers found in these fields 104, 106. Generally, this type of look up is accomplished through a simple data dictionary 200, such as that shown in FIG. 11. This dictionary 200 assigns integers to the Entity and Attribute values "Employee," "Project," "Employee Name," "Social Security," "Address," and "Salary." Using this data dictionary, the first four cells shown in FIG. 6 could be re-written to include integers in all fields except the V 108 field, as shown in FIG. 12. In this Figure, every one of the cells 100 has a value of 1000 in the E field. Looking this up in data dictionary 200 reveals that the number 1000 is interpreted to be an Employee entity. Thus, the use of the number 1000 has the same meaning as placing the word Employee in the E field 104. Similarly, the first cell 100 in FIG. 12 has the number 1010 in the A field 106. The number 1010 can be looked up in the data dictionary 200, and can be translated to the attribute "Employee Name." Similarly, the numbers 1011, 1012, and 1013 in the A filed 106 can be translated into the "Social Security," "Address," and "Salary" attributes, respectively.

Of course, the three column table that makes up data dictionary 200 in FIG. 11 would be more efficiently handled if it were converted into data cells 100 and added to the data universe of cells 100. The conversion of the look-up table of FIG. 11 into data cells 100 is shown in FIG. 13, with each of the entries in the data dictionary 200 being embodied in its own cell 100. To be consistent with the desire of allowing only integers in O 102, E 104, and A 106 fields, additional cells 202 had to be created in order to fully define the main entries in the data dictionary 200.

The cell universe shown in FIG. 13 also includes the same cells 100 shown in FIG. 12. These cells can now be interpreted by examining other cells in the same cell universe. Cell 300, for instance, has a value of "Johnson" in the V field 108, which needs no interpretation. But the E field 104 has a value of 1000. This can be interpreted by searching for the cell 302 that has an O field 102 with a value of 1000. This cell 302 has the string "Employee" in its V field 108, so we know that the value of the E field 104 in cell 300 can be interpreted as "Employee."

A further examination of cell 302 reveals that this cell itself has numbers for values in its E field 104 and A field 106. An interpretation of the number 200 in the E field 104 of cell 302 leads us to examine cell 304, since cell 304 has a O field 102 value of 200. Cell 304 has a V field 108 value of "Entity," so we know that cell 302 is a type of Entity. Next, interpreting the value of 202 in the A field 106 of cell 302 reveals that cell 302 is defining an attribute known as "Name." This was revealed because cell 306, which has a value of 202 in its O field, has the value "Name" in its V field 108. Thus, cell 302 can be fully interpreted to define an Entity, whose Name is Employee.

Cells can be interpreted further up the cell hierarchy until a "mother" cell is reached. A mother cell has values of "0" in its E field 104 and/or A field 106. The cell universe in FIG. 13 has two mother cells 308 and 310. Cell 304 can be interpreted by examining the mother cells 308, 310 so as to discover that cell 304 defines a Keyword whose String value is "Entity." Thus, cell 304 defines a keyword in the cell universe of FIG. 13, and that keyword is "Entity".

Returning to cell 300, the A value 106 is the number 1010. By searching for 1010 in the O field 102, we discover cell 312. The V value 108 of cell 312 indicates that cell 300 is defining the Employee Name attribute. Cell 312 can also be further interpreted, to indicate that cell 312 defines the Name (from cell 306) of an Attribute-type entity (from cell 314).

The meaning of cell 300 is now clear. Like all cells 100, cell 300 defines the value of an attribute for a specific entity. The entity of cell 300 is of the type "Employee." Specifically, cell 300 relates to instance one of all Employees. The attribute being defined by cell 300 is the "Employee Name" attribute. Thus, cell 300 is interpreted to mean that for instance number one of the Employee entities, the Employee Name is "Johnson."

5. Self Identification, Generations, and Transpositions

From the above description of the present invention, it is clear that data cells 100 can contain the same information that can be found in relational database tables, such as tables 10 and 40. In addition, the cells 100 can contain information on the relationships and association between cells 100 by using synapse cells 110. It has also been explained how data cells can contain the data dictionaries that are used to define the basic keywords, entities, and attributes that are used to organize the real data.

Since all this information is contained in the data cells 100 themselves, a database made up of data cells 100 can be described as self-identifying. In other words, data in the cell-based form of the present invention has inherent knowledge about itself. This knowledge is found in the cells 100 themselves, and not in a table or object construct external to the cells. As a result, cells can be distributed among as many physical domains as desired. In fact, if all data in all places were in cell-based form, then all of that data could be dynamically integrated into a single, super information source. In contrast, data found in relational databases have little in common with other such data other than that they exist in table format and that much of the definition of the database is not found in the table itself. As a result, it is not possible to simply combine data from multiple relational databases into a single merged database without carefully defining relationships and merging meta-data that is maintained outside of the actual data tables.

It is useful to consider the cells 100 shown in FIG. 13 as parts of cell generations. A "generation" of cells is a grouping of cells that contains information about real-world data at the same level of specificity. For instance, the cells 100 in FIG. 13 can be grouped into four generations. The first generation of cells 100, identified by number 204 in FIG. 13, contains basic information that is needed in order to define attributes and entities. Specifically, this first generation 204 defines two elemental concepts, namely Keywords and Strings.

The second generation, indicated by number 206, uses these elemental concepts to define three new concepts, namely Entity, Attribute, and Name. Each of these concepts are Keywords defined by a String attribute, as shown by the fact that each of their E fields 104 contains the value 100, and their A fields 106 contains the value 101. Thus, the second generation 206 defines three Keywords, namely Entity, Attribute, and Name.

The third generation 208 uses the three Keywords of the second generation 206 in order to define two Entities and four Attributes. Each Entity definition cells 100 contain the value 200 in their E field 104, and are defined solely by their Name, as shown by the value 202 in its A field 106. Similarly, each Attribute definition cell 100 contains the value 201 in its E field 104, and is also defined solely by its Name. This third generation 208 can be used to define additional general characteristics about Attributes and Entities, as is explained below.

The fourth generation 210 contains actual real-world attribute values. The data cells 100 in this generation 210 define the value of an attribute of a specific instance of a real-world entity, or define relationships between such data cells 100. The attributes and entities of the fourth generation 210 were defined in the third generation 208.

The utilization of one generation to interpret another generation is accomplished through the transposition process. Transposition is the linking a cell 100 in one generation with the cell 100 of another generation. One type of transposition is an O-to-E transposition, which links cells by comparing the O value 102 in one cell 100 with the E value 104 in another cell 100. Another transposition is an O-to-A transposition, which links cells by comparing the O value 102 in one cell 100 with the A value 106 in another cell 100.

When going from one generation to an earlier generation, both types of transposition will be used: O-to-E transposition will be used to interpret the E 104 value, and O-to-A transposition will be used to interpret the A 106 value. The arrows shown on FIG. 13 illustrate these two types transposition processes.

Transposition can also work in the other direction. For instance, in answer to a query as to which Employee has an Employee Name of "Johnson," transposition can be used to discover cell 300. This query would be analyzed starting at the mother cells of the first generation 204. Using both O-to-E and O-to-A transposition, it is possible to determine the O values 102 for the Entity keyword, found at cell 304, the Attribute keyword, found at cell 314, and the Name keyword, found at cell 306. From cells 304, 306, and 314, the process of transposition can locate cell 302, which defines the Employee entity, and cell 312, which defines the Employee Name attribute. The O values 102 of these two cells 302, 312, which are 1000, 1010, can then be used along with the desired name ("Johnson") to find cell 300.

6. Constraints

The use of these generations 204, 206, 208 and 210 allows the creation of self-identifying data dictionaries. In addition, generations can be used to contain general information about entities and attributes that are not specific to a specific instance of an entity. For instance, in database management systems it is often useful to place constraints on attribute values. Example constraints that are commonly encountered are the requirement that data be unique for an attribute among all instances on an entity type in the data universe, or that the data for a particular attribute be required (i.e., not null).

In prior art database management systems, this type of information would be stored separate from the data in the table or object definition. In the present invention, however, where the data is self-identifying, it is useful to store these constraints in the data universe itself. Of course, storing the constraints in each cell set 101 containing relevant data would be vastly inefficient, since these types of constraints are universal across all instances of an entity. Instead, the present invention utilizes the generational concept described above to store such constraints with the definition of the attribute itself.

FIG. 14 shows the same data universe as FIG. 13, with additional cells added to define various constraints. Included in FIG. 14 is a constraint that the Social Security number of an Employee is a required attribute that cannot be left empty (i.e., it cannot be null). The cells 100 that are required to implement this constraint have been italicized in FIG. 14 for ease in understanding. The italics is not meant to indicate that the cells 100 are physically different than any of the other cells in the data universe of FIG. 13.

To implement this constraint, two new Keywords are defined in generation 206. Cell 320 defines the Keyword AConstraint, which will be used to indicate an attribute constraint. The O value 102 of cell 320 is 203. Cell 322 defines the keyword Type, and has an O value 102 of 205.

The actual definition of the AConstraint is accomplished in generation 208 in cells 324 and 326. These cells 324, 326 are identified as defining attributes of an AConstraint by the value of 203 in their E fields 104. Their O field 102 value of 1110 indicates that they both define the same AConstraint. Cell 324 defines the Name (A field 106 of value 202) of the AConstraint as "SS Constraint," while cell 326 defines the Type (A field 106 of value 204) of the AConstraint as "Not Null." Thus, the SS Constraint requires attributes to have a Not Null value. All that is necessary to implement this constraint is to associate the Social Security Attribute with the SS Constraint, which is accomplished through the process of transmutation as reflected in cells 328 and 330. The Not Null constraint is just one of many possible attribute constraints that are possible in the present invention. Other constraints, such as uniqueness or data formatting constraints, could be created by providing other Type values, as should be obvious to those of ordinary skill in database definitions.

In addition to constraints on attributes, it is sometimes necessary to place constraints on the creation and destruction of relationships, or associations, between cells 100 and/or cell sets 101. For instance, it can be useful to differentiate between "weak" and "strong" associations. A weak association between cell sets 101 would allow the deletion of a cell set 101 and the related synapse cell 110 from another, associated cell set 101. A strong association would not allow such deletion. In addition, a strong association would general imply a certain type of relationship between the cell sets 101, such as a master-slave or parent-child relationship.

The types of associations that can be formed between entities can be defined by the generation that defines the entity through the use of entity constraints, or EConstraints. FIG. 14 shows a strong association constraint between the Employee and Project entities, in which the Employee references the Project and the Project is referenced by the Employee. The cells 100 that are used to define this association are shown bolded in FIG. 14 for ease in comprehension.

As with the AConstraint, the basic keywords that are used to define an EConstraint are first defined in generation 206. Specifically, the Keywords EConstraint, References, and Referenced By are defined in cells 340, 342, and 344, respectively. These Keywords are then used to define an EConstraint in generation 208 through cells 350-360. Cell 350 indicates that the name of this EConstraint is "E/P EConstraint." Cell 352 indicates that the Type (A field 106 is 204) for this EConstraint is Strong. This particular EConstraint also specifically identified entities as either one that References the other, or is Referenced By the other. The identification of these entities is accomplished through cell 354 (which identifies the Employee entity—1000—as the References—206—entity) and cell 356 (which identifies the Project entity—1001—as the Referenced By—207—entity).

The remaining cells 358 and 360 that define E/P Constraint are simple synapse cells 110 that link the E/P EConstraint with the definitions of the Employee entity and the Project entity, respectively. The synapse cells 362, 364 that form the other half of these associations are found in FIG. 14 next to the cells 100 that define the name of the Employee and Project entities.

7. Attribute and Entity Associations

As described above, constraints on attribute values and constraints on the creation and destruction of associations between cell sets 101 can be defined using the concept of generations. The constraints are defined in the third generation 208, using the keywords defined in the second generation 206. These constraints are then used during the creation and maintenance of real world data in the fourth generation 210.

The use of prior generations to define attributes of the cell universe can be expanded beyond constraints to the relationship between attributes and entities on a general level. Like FIG. 14, FIG. 15 shows the same data universe as FIG. 13, with additional cells added to define various relationships between entities and attributes. Shown in italics in FIG. 15 are the additional cells 100 that are necessary to show a relationship between certain entities and certain attributes. Cells 370-376 help to define the entity whose name is Employee. These cells 370-376, with A 106 values of 201, indicate that this entity has four attributes associated with it, namely attributes 1010, 1011, 1012, and 1013. These four attributes are the Employee Name attribute 1010, the Social Security attribute 1011, the Address attribute 1012, and the Salary attribute 1013. Cells 378, 380, 382, and 384, respectively, further define each of these four attributes by indicating that the attributes have been used in connection with the Employee entity.

It should be clear that the cells 370-384 are simply linkage or synapse cells 110, which indicate that the Employee entity has been associated with each of the four attributes. Once these associations have been made, they are used by a database management system to identify associated attributes from a particular entity, and vice versa. Thus, if a user were asked to input information about an Employee entity, the database management system would likely offer the user to ability to input information for these four attributes.

It is also possible to define a data format for each attribute. An example of a data format definition is shown in FIG. 15 utilizing the cells 100 shown in bold. In this example, three additional keywords were defined in cells 386-390, namely "Data Format," "Data Type," and "Length." A new data format is created through cells 392 and 394. This data format (having an O 102 value of 1100), has a Data Type of "String" (defined by cell 392) and a Length of 50 (defined by cell 394). The only attribute to use this Data Format in FIG. 15 is the Employee Name attribute, which can be seen by the synapse cells 396 and 398 that link the Employee Name attribute with this Data Format.

8. Specific Implementation of Cells

As explained above, a data cell 100 contains the value of a single attribute and enough information to identify the attribute and associate the attribute with a particular instance of an entity type. In the preferred embodiment, the data cell 100 is constructed with four data fields: O 102, E 104, A 106, and V 108. These four fields are each a necessary element of meeting the requirements of a data cell 100. The removal of one of the fields would remove from the cell 100 necessary information to relate the value to a specific attribute of a specific instance of an entity. If a certain field were missing, it would no longer be possible to efficiently manage the data cells 100.

As an example, one might consider removing the E field 104 in each cell 100, with the O 102, A 106, and V 108 fields remain unchanged. In this theoretical example, cell sets 101 would be identified by cells 100 having a common O 102 value, which would be subject to a constraint that each O 102 value be unique across the whole data universe. Each cell set 101 could then contain a special cell 100 that always contains entity type information for the cell set 101 (such as "Employee" or "Project"). It would be possible to identify all cell sets relating to employees, such as by searching for cell sets 101 having a type cell 100 with a V 108 value of Employee. However, the ability to search for an Employee whose Name is "Johnson" would, for all intents and purposes, be lost. The only way this would be feasible, without a E 104 value in each cell, is to first search for all cell sets 101 having a type cell 100 with a value of Employee. Once this first search is complete, a second search would then examine the cell sets 101 discovered in the first search for an A 106 value of Name and a V 108 value of Johnson. This two-part search is be possible, but it is so impractical as to make the three field data cell 100 almost unusable.

In addition to requiring all four data fields 102, 104, 106, and 108, data cells 100 ideally have no other fields relating to real-world data. In fact, any additional data field would be counter productive, since such information would necessarily relate to multiple attributes or multiple entity instances. The inclusion of multiple values in the one V field 108 of a single cell 100, where all of the values relate to a single attribute of a specific instance of an entity is possible and is discussed below in connection with an alternative embodiment.

Thus, the ideal data cell 100 contains exactly four fields (O 102, E 104, A 106, and V 108) relating to real-world data. However, it is possible and even preferred to associate additional administrative overhead information with each cell 100. This meta-data information, which would vary according to the specific implementation of the data cell 100, would not include information about real-world entities or attributes, and hence would not constitute actual data. Rather, this overhead-related information would simply constitute meta-data about a single data cell 100. FIG. 16 shows the overhead-relating information that is stored in connection with each data cell 100 in the preferred embodiment.

The first two values 120, 122 in FIG. 16 relate to the cell 100 as a whole, while the last value 124 relates only to the V field 108 of the cell 100. Consequently, the preferred embodiment refers to the first two values 120, 122 as "high" values, while the last value 124 is referred to as the "low" value.

The first value in FIG. 16, namely the cell type 120 information, identifies different types of cells. For instance, one can use this information to differentiate between a synapse cell 110 and a normal data cell 100. The cell status 122 information is used to manage multi-party access to the data cells 100. The cell status 122 contains the check out status of the cell 100, particularly whether the cell has been retrieved, is being updated, or is being deleted by a user. This type of check out status information is common in database management systems.

The data type 124 information is used to specify the data type of the information stored in V 108. The present invention is able to handle all data types, including integer, fixed, and floating numeric types, character and string types. One of the most useful of the data types used in the present invention is the multiple ordinal type, which allows two or more ordinal values to coexist in the V 108 field. Generally, a multiple ordinal is represented by listing the ordinals together, separated by periods. For instance, the value "6.50.3" is a multiple ordinal comprising three ordinal numbers, specifically the numbers 6, 50, and 3. The data type definition of a multiple ordinal value can be represented using the short-hand expression MO(#), where "MO" represents a multiple ordinal data type, and the pound symbol "#" is replaced with a number indicating the number of values in the multiple ordinal data type.

Although not included in the preferred embodiment, an additional meta-data element that could be included with each cell 100 is information relating to the order of appearance of a particular cell 100. Such information could be used to track when a cell 100 was added to the data universe. This type information is usually only useful in a relative way when comparing two V 108 values for the same O 102, E 104, and A 106 values. In other words, when comparing the same attribute values for the same instance of the same entity, and it is important to know which value was added to the data universe first. In this circumstance, only the relative value of this information is important, and the absolute value of the order of appearance for a cell 100 is not directly useful. Consequently, a system for recording the order of appearance can be straightforward, such as a simple counting mechanism, although a time stamp made when the cell was created or modified would also work adequately. Although order of appearance information is not found in FIG. 16, and hence is not used in the preferred embodiment, this type of information can be tracked in the preferred embodiment without using a dedicated meta-data field. This is described below in connection with multiple attribute values for the same attribute.

Generally, only one value for an attributed will be found in the V field 108 of a single cell 100. In the preferred embodiment, this is required. If an attribute for a particular instance of an entity is allowed to have multiple values, these values are handled with multiple cells 100, each having the same values in the O 102, E 104, and A 106 fields. However, it would be well within the scope of the present invention to allow a single cell 100 to have multiple values in the V field 108 of a cell 100. For instance, using the multiple ordinal data type, it would be possible to put multiple values that relate to the same combination of O 102, E 104, and A 106 in a single cell 100. Of course, to use the multiple ordinal data type, it would be necessary that each of the values be represented as an ordinal. However, as explained below in the section on pooling, it is possible to convert any value in a data cell 100 to ordinal values. This means that multiple values of any type can share a cell 100, as long as each of these values relates to the same O 102, E 104, and A 106.

In this alternative embodiment of allowing multiple V 108 values in a single cell 100, it would be useful to add one additional type of "low" meta-data, namely value status information. The value status information would be used to manage multi-party access to multiple values in a V field 108. Since the V field 108 can have multiple values in this embodiment, it is possible that a user has retrieved, is updating, or is deleting only a single one of the values in the V field 108. The value status information allows this information to be tracked for each value rather than on a cell 100 by cell 100 basis, as is done with cell status information 122.

9. Types of Associations

As explained above, the process of Transmutation allows linkages to be created between two cell sets 101. This type of "set-to-set" association is extremely important in creating a modern database management system. Sometimes, however, it can be useful to create a link from a single cell to another cell, or between a single cell and a cell set. "Cell-to-set" associations can be easily created in the present invention using multiple-ordinal data types.

An example of a cell-to-set relationship is seen in cell universe 400 shown in FIG. 17. In the cells 100 of this cell universe 400, two entities are created, namely a Person entity in cell 402, and a City entity in cell 404. In addition, three attributes are created, namely a Person's Name in cell 406, a City Name in cell 408, and a Mayor in cell 410. The cell universe 400 contains only two cell sets 420, 422, with the first cell set 420 containing cells 100 relating to a person named Johnson and the second set 422 containing cells 100 relating to the city named Big Town.

The linkages between the person Johnson and the city Big Town are found in cells 412 and 414. Cell 412 is the same type of synapse cell 110 first discussed in connection with FIGS. 8 and 9. This cell has an A 106 value of 1001, which is equal to the E 104 value of cell set 422, and a V 108 value of 10, which is equal to the O 102 value of cell set 422. Thus, this cell 412 links to the entire cell set 422.

In contrast, cell 414 is slightly different. Cell 414 has an A 106 value of 1000, which is the E 104 value of cell set 420. The difference lies in the V 108 value, which is "1001.1". This value is the O 102 value of cell set 420, preceded by the A 106 value of cell 412. Thus, rather than linking to the entire cell set 420 by identifying only the O 102 and E 104 values of the set 420, cell 414 identifies the O 102, E 104, and the A 106 value of cell 412. As a result, this cell 414 links only to cell 412, and a cell-to-set relationship is defined by cells 412 and 414.

Since cell 414 has two ordinal values in its V 108 field, the data type of this field is MO(2). This definition is incomplete, however, since it is possible that a two value field might have a meaning other than an A 106 field value followed by an O 102 value. To include this amount of information in the data type value, it is necessary to include a mask in the data type. Specifically, the mask for cell 414 would be AO, indicating that the V 108 field contains an A 106 value followed by an O 102 value. In the present invention, the mask is part of the data type definition, and is included within the parentheses as follows: MO(2,AO). It would be possible to link to three cells like cell 412 in the single cell 414. This would be accomplished by creating a multiple-ordinal data type having six values, specifically three AO pairs. This data type definition could be written in shorthand as MO(6,AO(3)).

In this syntax, the data type of a cell containing a normal link to a cell set could be considered to be MO(1, O). It is also possible to create a cell 100 with a V 108 data type of MO(2, EA). This cell 100 would link to other cells of a specific entity type (a specific E 104 value) and having a specific attribute type (a specific A 106 value). For instance, in the context of cell universe 400, the value could be 1001.2002, which would link to all cells defining a Mayor attribute for a City entity.

The above description shows how MO(2,AO) cell and a MO(1,O) cell form a cell-to-set relationship. To create a cell-to-cell relationship, all that would be necessary is to create two cells, each with an MO(2,AO) data type. Each cell would then look like cell 414, and directly link to the other cell.

10. Data Pooling

FIG. 18 shows an extension of data universe 400 with two additional cell sets 424 and 426 added, along with an attribute defining a State for a city (cell 415 with an O 102 value of 2003). Each of the city cell sets 422-426 in data universe 400 are seen to be in the state of Minnesota, since each cell set contains a cell 416, 417, and 418 having an A value of 2003 and a V 108 value of "Minnesota."

The present invention includes a mechanism for normalizing these cells 416-418 in order to prevent the redundancy inherent in storing three cells with the same "Minnesota" value. The basic concept of normalization can also be found in prior art relational databases. In the preferred embodiment, however, normalization is carried out in a unique way by taking advantage of multiple-ordinal data types and the cell-based nature of data storage in the present invention.

Normalization in the preferred embodiment is accomplished through the use of data pools, as shown in FIG. 19. As can be seen in that Figure, a new cell 419 has been added that defines "Pool" as a keyword associated with an O 102 value of 1100. In addition, each of the V 108 values in cells 416-418 has changed from "Minnesota" to "1100.100." Although it is not shown in FIG. 19, the data types associated with these values have also changed to indicate that the V 108 values of these cells 416-418 now contain a pointer to a data pool.

The data pool for the value Minnesota is found in cell set 430, which has an O 102 value of 100 (to uniquely identify the data pool) and an E 104 value of 1100 to identify the cell set 430 as a data pool. The data pool cell set 430 contains five cells 432-440, which identify the various attributes of the data pool. Cell 432 identifies the value of the pool, namely "Minnesota." Thus, each cell 100 that has a V 108 value of Minnesota can simply point to the data pool rather than containing the actual value Minnesota. Cell 434 identifies the Count statistic for the data pool, and its V 108 value indicates that three cells 100 now contain pointers to this data pool. This statistic is updated every time a cell containing a pointer to the data pool is added, deleted, or altered, so as to ensure that the Count statistic is accurate.

The data pool shown in FIG. 19 relates only to the State attribute of City entities. If a Person entity of cell universe 400 also contained a State attribute, a separate data pool would have to be created. The restriction of the data pool of cell set 430 to a particular attribute of a particular entity is defined by cells 436-440. Cell 436 defines the "Level" of the data pool to be of type EA. In other words, the data pool relates to a particular E and A combination, such as the City entity and State attribute. Cells 438 and 440 then define which E and A value are associated with this Pool. Cell 438 defines the entity or E_Compare value to be 1001 (or the City entity). Likewise, cell 440 defines the attribute or A_Compare value to be 2003 (or the State attribute).

Data can be pooled merely to avoid duplication and redundancy in the data universe. However, in the preferred embodiment, the ideal is to pool every V 108 value of every cell 100. The reason for this is that once the V 108 value of every data cell 100 is pooled, only cells 100 containing the Value attribute of data pools have anything other than numeric values in all fields 102, 104, 106, and 108 of the data cell 100. A direct result of this is increased efficiency in the storage, retrieval, and searching of data cells 100. In addition, additional types of searches become possible when all V 108 data values have been pooled, as is described below.

In most circumstances, it is not efficient to pool the V 108 value of every data cell in the data universe. Consequently, a cost-benefit analysis is usually undertaken to determine whether the benefits of data pooling (namely, decreased redundancy and increased searching flexibility) are outweighed by the cost of administering the data pool.

11. Storage and Searching of Data Cells

All data in the present invention is stored in data cells 100 having four data fields 102, 104, 106, and 108. This does not mean, however, that each field 102-108 of the cell 100 must be stored contiguous with the other data fields. It also does not mean that duplication in the content of the data fields 102-108 cannot be prevented through the use of unique storage structures. In fact, the actual storage of data cells in the preferred embodiment of the present invention is accomplished through the storage of information in a four-level storage trees 500, such as that shown in FIG. 20.

Storage tree 500 of the preferred embodiment are made up of four levels, one for each of the data fields 102-108 in a data cell 100. In FIG. 20, these levels are arranged with an E level 510 on top, an A level 520 next, a V level 530 under the A level 520, and finally an O level 540. Other arrangements are possible, with each arrangement having its own benefits. In the preferred embodiment, multiple storage trees 500 are created and maintained for each data universe.

The E level 510 contains "w" number of entries 512, with w being the number of unique values found in the E field 104 of all data cells 100 in the current data universe. Each unique E value is stored in a separate entry 512 in E level 510, preferably sorted from lowest to highest, or vice versa.

Each E entry 512 in the E level 510 points to a unique list of entries 522 in A level 520. In FIG. 20, the entry 512 for $E_i$ is pointing to an A level 520 that contains "x" number of A list entries 522. The number x is equal to the number of unique values found in the A field 106 of data cells 100, where the E field 104 value of such cells 100 is equal to the value in the E entry 512 labeled $E_i$. A different E entry 512 would point to a different A level 520, which may contain a different number of A list entries 522.

Similarly, each A entry 522 in the A level 520 points to a unique list of V entries 532 in the V level 530. The V level 530 in FIG. 20 contains "y" number of V entries 532, where y is equal to the number of unique values found in the V field 108 of cells having an E field 104 value equal to the value in the E entry labeled $E_i$ and an A field 106 value equal to the value found in the A entry labeled $A_i$.

Finally, each V entry 532 in the V level 530 points to a unique list of O entries 542 in the O level 540. The O level 540 in FIG. 20 contains "z" number of O entries 542. In this case, z is equal to the number of unique values found in the O field 102 of those cells 100 having an E field 104 equal to the value in $E_i$, an A field 106 equal to the value in $A_i$, and a V field 108 equal to the value in $V_i$.

Figure 21:
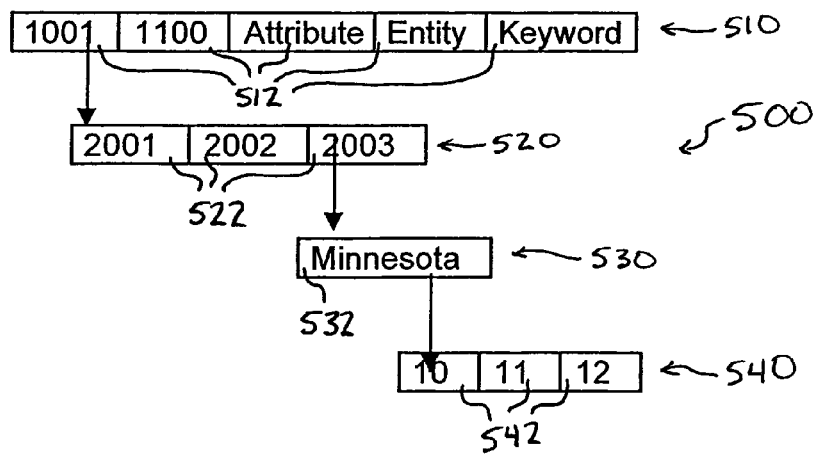
FIG. 21 shows the storage tree of FIG. 20 populated with sample data.

FIG. 21 shows an example storage tree 500 utilizing data from the cell universe 400 shown FIG. 19. The E level 510 contains five E entries 512: 1001, 1100, "Attribute," "Entity," and "Keyword." Note that the "Entity," "Keyword," and "Attribute" values in E entries 512 would all be associated with a number in an actual implementation by using the data dictionary and self identification principles described above.

The A level 520 shown in FIG. 21 is that pointed to by the E entry 512 having a value of 1001 (i.e., entities that are Cities). For Cities, there are only three A field 106 values, namely 2001 (City Name), 2002 (Mayor), and 2003 (State). Thus, there are only three A entries 522 in A level 520.

The V level 530 in FIG. 21 is being pointed to by an A entry 522 having a value of 2003, or State. In data universe 400, all Cities have a State attribute value of Minnesota. Thus, V level 530 has only one entry 532, namely Minnesota. Finally, the single entry 532 in V level 530 points to the O level 540, which contain three O entries 542. These three entries 542 contain the O field 102 values for the three cities in data universe 400 having a State attribute value of "Minnesota."

The storage tree 500 shown in FIGS. 19 and 20 is called an "A Set" tree. A Set trees 500 are layered E-A-V-O, and are named A Set trees for their usefulness in finding information based upon a particular value of an A field 106. For example, if a query wished to find all Cities whose State attribute was equal to Minnesota, this tree would be extremely efficient at finding the O values of the appropriate data cells sets 101. However, the A Set trees are not that useful at finding the City Names of City entities having a particular O value. For these situations, it would be best to have a tree layered in the following order: E-O-A-V. This type of tree, called an E Set tree 550, is shown in FIG. 22.

Figure 22:
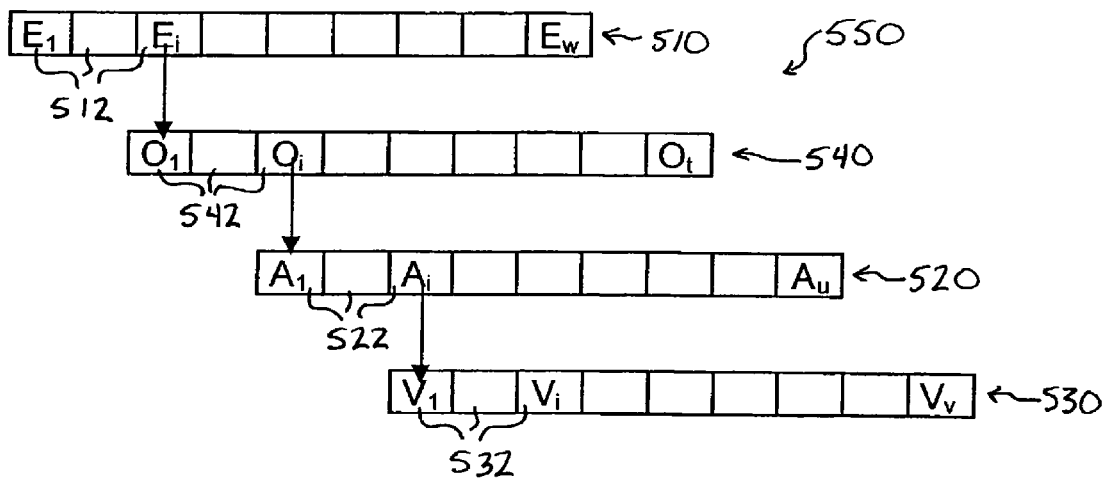
FIG. 22 is a graphical representation of a storage tree for storing cells in an E-O-A-V hierarchy.

The E Set tree 550 of FIG. 22 starts with the E level 510, which contains w number of E entries 512, as was the case with A Set tree 500. However, rather than pointing to the A Level 520, the E entry 512 in the E Set tree 550 points to the O level 540. The O level contains "t" number of entries 542, with "t" being equal to the number of distinct values for O 102 for all cells in the cell universe having an E 104 value equal to the value of the $E_i$ entry 512. Similarly, the $O_i$ entry 542 points to an A level 520, having "u" number of entries 522, with u being equal to the number of unique A 106 values in all cells 100 having an E 104 value equal to the value of $E_i$, and having an O 102 value equal to the value of $O_i$. Finally, the $A_i$ entry 522 points to the V level 530. This level 530 has "v" number of entries 532, with "v" equal to the number of distinct V values 108 in the cells having an E 104 value equal to the value of $E_i$, an O 102 value equal to the value of $O_i$, and an A 106 value equal to the value of $A_i$.

Figure 23:
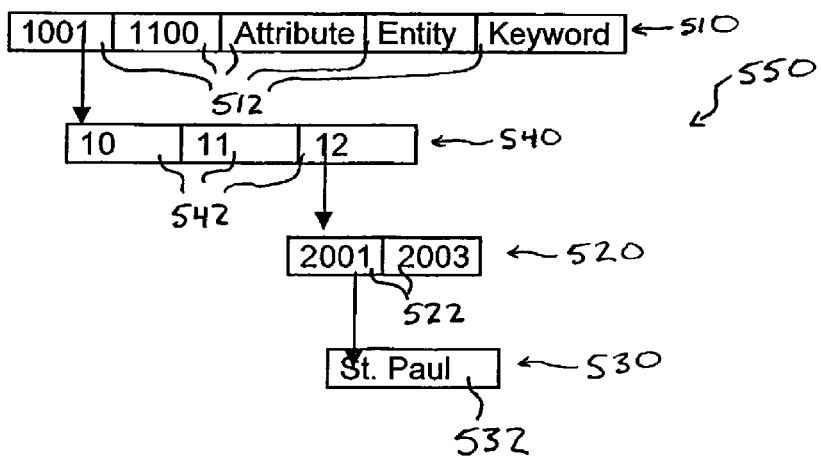
FIG. 23 shows the storage tree of FIG. 22 populated with sample data.

FIG. 23 shows the E Set storage tree 550 populated with data from the cell universe 400 shown FIG. 19. The E level 510 is populated with the same five E entries 512 as shown in FIG. 21. The first E entry 512 is 1001, indicating entities of the type City. The O level 540 pointed to by the first E entry 512 shows all of the O values 102 for cells that relate to City entities, specifically the values 10, 11, and 12. The last O entry 542 is 12. This entry 542 points to the A level 520, with the A level 520 containing only two entries 522. These two entries indicate that instance 12 of the City type entity has only two relevant attributes, namely 2001 ("City Name") and 2004 ("State"). Finally, the V level 530 completes the tree, with the sole entry 532 in the V layer indicating that for instance 12 of the City entities, the City Name is "St. Paul."

The E Set storage tree 550 is designed to determine the value (V 108) for an attribute (A 106) for a given instance (O 102) of an entity (E 104). Thus, this tree 550 can be used with the A Set tree 500 to complete the following hypothetical query: Select City Name From City Where State Equals "Minnesota." To generalize, this query is of the form Select V From E Where A Equals V. To solve this query, the O value is determined using the E, A, and V values in the query. This is accomplished with the E-A-V-O hierarchy of the A Set tree 500. Next, with the determined O value and known E value, the only remaining task is to retrieve a V for a given A. The E Set tree 550 with its E-O-A-V hierarchy is used to retrieve this information.

Other types of storage trees are also utilized in the present invention to handle other types of queries. For instance, a query could be formed of the type: Select V from E where ? Equals "Minnesota." In this type of queries, it is necessary to determine the O values of cells 100 having a known E 104 and V 108 value, regardless of which attribute (A 106) is being defined. A storage tree known as a V Set tree has a hierarchy of E-V-A-O, and could be used to answer this query. Another possible storage tree has a hierarchy of V-A-E-O is known as an O Set tree. O Set trees could determine an answer for a query of the type: Select V from ? where ? Equals "Minnesota." Each of these storage trees exist simultaneously in the present invention, allowing the most appropriate tree to be selected in response to a query.

12. Multiple Attribute Values

FIG. 24 shows a collection of data cells 100 defining two instances of an Employee entity, namely an employee named Johnson (defined by cell set 551) and an employee named Rodriguez (defined by cell set 560). Each cell set 551, 560 contains a cell that defines the Employee Name attribute, namely cells 552 and 562. In addition, the Johnson cell set 551 has two cells 554 and 556 that define the Address attribute, while the Rodriguez cell set 560 has only one Address cell 564. These cells 554, 556, and 564 are known to define the Address attribute since they have an A value 106 of 1012, which is interpreted by examining the cell 570 that provides the name (i.e., "Address") for this attribute.

The existence of two cells 554, 556 defining the same attribute for the same instance of the same entity is generally allowed in the present invention. In the example of FIG. 24, this might indicate that the employee named Johnson has two different addresses, one in Minneapolis and one in St. Paul. It is possible to control whether or not a particular attribute is allowed to have multiple entries through the definition of the attribute in a prior generation. This could be done as part of the attribute's Data Format definition as described above, or could be done as a separate element of the attribute definition.

In some embodiments of the present invention, it is important to know which of the data cells 554, 556 were first entered into the system. As discussed above, it is possible to add order of appearance meta-data to each cell 100 to assist in this process. Alternatively, multiple instances of the same attribute value could be handled as shown in FIG. 25.

In this Figure, the cell 570 defining the Address attribute has been replaced by two cells 572 and 574. The first cell 572 defines the Address attribute where only one address exists in a cell set 101, and hence has the name Address-Single. The second cell defines the Address attribute where multiple addresses exist in a cell set 101, and has the name Address-Multiple. In a true implementation, it is likely that both cells 572, 574 will have the same name (simply "Address"), with the differentiation between single and multiple attributes being made in additional cells 100 that define additional characteristics of the attributes. For the purpose of explaining the present invention, however, this differentiation is simply reflected in the name of the attribute. It would also be necessary in a true implementation to reflect the fact that these two Address attributes are in fact two parts of the same attribute.

Using these two separate attributes, it is seen that the cell 564 defining the Address attribute for Rodriguez is unchanged. In contrast, the two cells 554, 556 that define the Address attribute for Johnson have been replaced by a single cell 558. This cell uses the attribute value 1014 to indicate that multiple address attribute values exist for this cell set 551. The V 108 value of this cell 558 is the number 10, which references the cell set 580. This cell set 580 has three cells 582-586. The first two cells 582, 584 have the actual attribute values "Minneapolis" and "St. Paul" in their V 108 fields. Since it is clear that the values are Address attributes based on the value of 1014 in their E 104 fields, the A 106 field in these cells 582, 584 is available to track the order of appearance data. Cell 586 completes the linkage with the Johnson cell set 551.

When interpreting cell 558, a database management system would understand from its A 106 value that this cell defines a value for an attribute containing multiple values. As a result, the database management system would know that the actual values for this attribute will be in the cell set 101 pointed to by this cell 558 (specifically, cell set 580 having an O value of 10 and a E value of 1014). In examining this cell set 580, it is clear that there are two values, namely Minneapolis and St. Paul, with the Minneapolis value being entered into the system first given its lower value in the A 106 field.

13. Conclusion

The above description provides an illustrative version of the present invention. It should be clear that many modifications to the invention may be made without departing from its scope. For instance, it would be possible to include only some of the elements of the present invention without exceeding the essence of the present invention. Therefore, the scope of the present invention is to be limited only by the following claims.

What is claimed is:

1. A computer related article of manufacture comprising:
a non-transitory computer readable medium having a storage tree for storing a data universe of data cells to assist in the searching for particular data cells, where each data cell has four fields, namely an instance identifier field, an entity type field, an attribute type field, and an attribute value field, the storage tree comprising
   a) a first level of first entry values, the first entry values being composed of all of the unique values found in a first field of the data cells;
   b) at least one second level of second entry values, with a separate second level associated with each first entry value in the first level, with the second entry values in each second level being composed of all of the unique values found in a second field of all data cells that have the associated first entry value in their first field;
   c) at least one third level of third entry values, with a separate third level associated with each second entry value in each of the second levels, with the third entry values in each third level being composed of all of the unique values found in a third field of all data cells that have the associated first entry value in their first field and the associated second entry value in their second field; and
   d) at least one fourth level of fourth values, with a separate fourth level associated with each third entry value in each of the third levels, with the fourth entry values in each fourth level being composed of all of the unique values found in a fourth field of all data cells that have the associated first entry value in their first field, the associated second entry value in their second field, and the associated third entry value in their third field.

2. The article of manufacture of claim 1, wherein the first field is the entity type field, the second field is the attribute type field, the third field is the attribute value field, and the fourth field is the instance identifier field.

3. The article of manufacture of claim 1, wherein the first field is the entity type field, the second field is the instance identifier field, the third field is the attribute type field, and the fourth field is the attribute value field.

4. The article of manufacture of claim 1, wherein the first field is the entity type field, the second field is the attribute value field, the third field is the attribute type field, and the fourth field is the instance identifier field.

5. The article of manufacture of claim 1, wherein the first field is the attribute value field, the second field is the attribute type field, the third field is the entity type field, and the fourth field is the instance identifier field.

6. A computer implemented method for searching a computerized database comprising:
   a) storing on a non-transitory computer readable medium a first storage tree for storing a data universe of data cells, where each data cell has four fields, namely an instance identifier field, an entity type field, an attribute type field, and an attribute value field, the storage tree having
      i) a first level of first entry values, the first entry values being composed of all of the unique values found in a first field of the data cells,
      ii) at least one second level of second entry values, with a separate second level associated with each first entry value in the first level, with the second entry values in each second level being composed of all of the unique values found in a second field of all data cells that have the associated first entry value in their first field,
      iii) at least one third level of third entry values, with a separate third level associated with each second entry value in each of the second levels, with the third entry values in each third level being composed of all of the unique values found in a third field of all data cells that have the associated first entry value in their first field and the associated second entry value in their second field, and
      iv) at least one fourth level of fourth values, with a separate fourth level associated with each third entry value in each of the third levels, with the fourth entry values in each fourth level being composed of all of the unique values found in a fourth field of all data cells that have the associated first entry value in their first field, the associated second entry value in their second field, and the associated third entry value in their third field;
   b) searching the first storage tree for at least one fourth value based upon knowledge of a first value by examining all fourth levels having the associated first value.

7. The method of claim 6 wherein the first field is the attribute value field, the second field is the attribute type field, the third field is the entity type field, and the fourth field is the instance identifier field, and the searching step discovers at least one instance of any entity type having a particular attribute value for any attribute type.

8. The method of claim 6, wherein the second value is also known, and the tree is searched to find all fourth values having the known first, and second values.

9. The method of claim 8, wherein the first field is the entity type field, the second field is the attribute value field, the third field is the attribute type field, and the fourth field is the instance identifier field, and the searching step discovers at least one instance of the particular entity type having a particular attribute value for any attribute type.

10. The method of claim 8, wherein the third value is also known, and the tree is searched to find all fourth values having the known first, second, and third values.

11. The method of claim 10, wherein the first field is the entity type field, the second field is the attribute type field, the third field is the attribute value field, and the fourth field is the instance identifier field, and the searching step discovers at least one instance of the particular entity type having a particular attribute value for an attribute type.

12. The method of claim 10, wherein the first field is the entity type field, the second field is the instance identifier field, the third field is the attribute type field, and the fourth field is the attribute value field, and the searching step discovers at least one attribute value of an attribute type for a particular instance of a particular entity type.

13. The method of claim 6, further comprising the step of structuring at least one additional storage tree with a similar four level structure and the same data as the first storage tree, the at least one additional storage tree organizing the instance identifier field, the entity type field, the attribute type field, and the attribute value field into different levels of the four level structure than the first storage tree.

14. The method of claim 13, further comprising selecting a preferred storage tree to search based upon the particulars of the search and the level structure of the storage trees.

15. A computer implemented method for searching a computerized database comprising:
   a) storing on a non-transitory computer readable medium at least three storage trees for storing a data universe of data cells, where each data cell has four fields, namely an instance identifier field (O), an entity type field (E), an attribute type field (A), and an attribute value field (V),
      i) each storage tree defining a hierarchy with a first level having all of the unique values found in a first field of the data cells, a second level linked to by the first level having all of the unique values found in a second field of the data cells, a third level linked to by the second level having all of the unique values found in a third field of the data cells, and a fourth level linked to by the third level having all of the unique values found in a fourth field of the data cells,
      ii) a first storage tree having the first through fourth levels having values from the E, A, V, and O fields, respectively;
      iii) a second storage tree having the first through fourth levels having values from the E, V, A, and O fields, respectively;
      iv) a third storage tree having the first through fourth levels having values from the E, 0, A, and V fields, respectively;
   b) selecting one of the storage trees for use in a search based upon which fields are known values for the search; and
   c) searching the selected storage tree for at least one unknown fourth-level value using the known values.

16. The computer implemented method of claim 15, further comprising a fourth storage tree having the first through fourth levels having values from the V, A, E, and O fields, respectively.

* * * * *